S. KAHN.
MEMORANDUM DEVICE.
APPLICATION FILED JULY 29, 1907. RENEWED FEB. 6, 1909.
916,561. Patented Mar. 30, 1909.
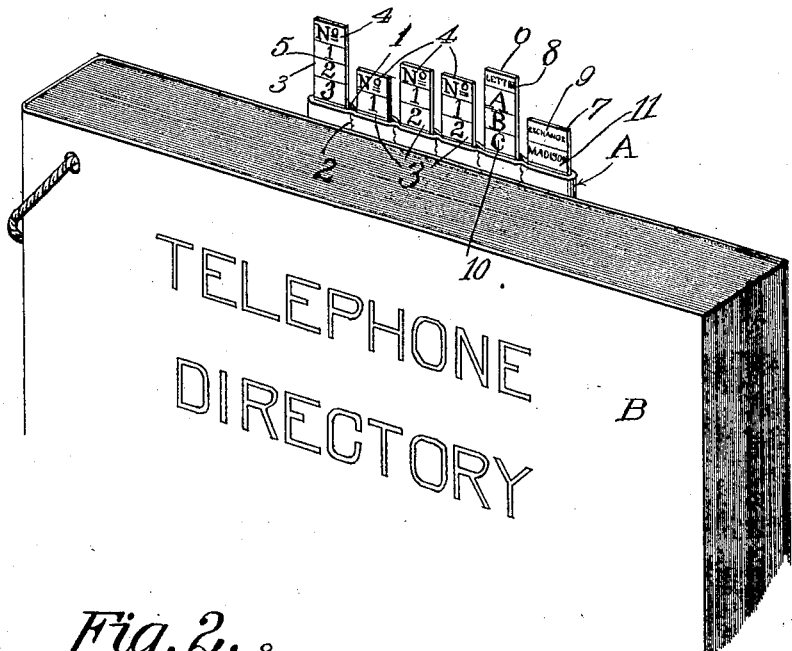
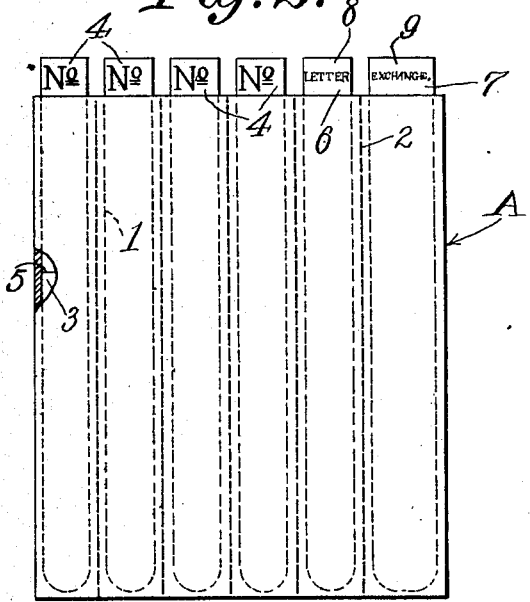
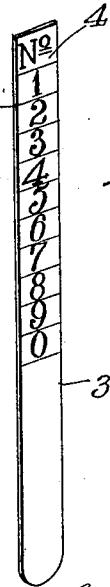

UNITED STATES PATENT OFFICE.

SAMUEL KAHN, OF BALTIMORE, MARYLAND.

MEMORANDUM DEVICE.

No. 916,561.      Specification of Letters Patent.      Patented March 30, 1909.

Application filed July 29, 1907, Serial No. 385,967.    Renewed February 6, 1909. Serial No. 476,482.

*To all whom it may concern:*

Be it known that I, SAMUEL KAHN, a citizen of the United States, residing at Baltimore city, State of Maryland, have invented certain new and useful Improvements in Memorandum Devices, of which the following is a specification.

My invention relates to an improvement in memorandum devices, and is particularly adapted to record telephone calls and the like, while not restricted in its use to this particular object, nevertheless it is for this purpose that the device is most applicable.

With the foregoing object in view, my invention consists in certain novel features of construction and combinations of parts which will be hereinafter described and pointed out in the claim.

In the accompanying drawings, Figure 1, is a perspective view showing the application of the invention; Fig. 2 is a face view of the invention, and Fig. 3, is a detail view of one of the recording strips.

A, represents the holder, made from any suitable material.

1, represents a series of pockets, which are constructed in the device by means of the partitions formed by sewing the front and back sides of the holder A together at 2; 3, designates the slides adapted to be slidably secured in the pockets 1, and are extended beyond and without the pockets a suitable distance at the top, that the indexes 4 are at all times visible.

The device may be enlarged to contain any number of slides that may be desired, and the several slides may be indexed according to the purpose for which they may be desired to be used. For instance, the first four slides indicated 3, to the left, are indexed "No." designating that the slides are provided with numerals 1 to 0 printed thereon, a detail view of one of the slides being shown on Fig. 3. These numerals are spaced at suitable distances apart as designated by 5; the first two slides to the right 6 and 7 are indexed "Letter" and "Exchange" respectively, as indicated by 8 and 9, and on the slide 6 is printed a series of letters of the alphabet as indicated by 10 shown in Fig. 1, while the first slide 7 to the right, indexed "Exchange" has printed thereon the name of the several changes as indicated by 11 in Fig. 1.

The alphabetical letters on the slide previously described and the names of the several exchanges just described are spaced on the respective slides at equal distances apart similar to the slide provided with the numerals thereon, so when the device is closed it will appear as shown in Fig. 2, and when in use the withdrawal of the first four slides 3 to the left equal distances, will cause similar numerals to become visible. It necessarily follows that upon the withdrawal of the two slides 6 and 7 on the right, at certain equal spaced distances a new letter and name of the exchange desired will become visible.

B, represents an ordinary telephone directory on the back of which the device is adapted to be secured in any suitable manner (not shown) and so secured that the device will project above the top edge of the said directory as shown in Fig. 1.

My device is operated as follows: If for any reason one desires to make a memorandum of a telephone call either for the purpose of calling a particular number or to record the number of an incoming call, the slides 3 are withdrawn from the holder sufficiently to cause the respective numbers of the call to appear in a parallel line above the edge of the book; next is withdrawn the slide 6 indicating the letter designating the call (if the call happens to contain a letter) in many instances telephone exchanges are conducted on what are known as party lines, several parties using the same line, their respective numbers being the same but distinguished by an alphabetical letter, lastly the slide 7 is withdrawn until the name of the exchange desired becomes visible and parallel with the numerals and the alphabetical letter of the respective slides 3 and 6, for example the call as shown by the memorandum in Fig. 1, indicates that the number desired to be called is 3122 C Madison.

It will be seen that I have provided a device cheap of manufacture (as the device may be manufactured from any suitable material such as paper, card board, celluloid and the like) simple in operation, and effective for the purpose of which it is intended.

Slight changes within the scope of the appended claims might be resorted to in the form and arrangement of the several parts described, without departing from the spirit and scope of my invention, and hence I do not wish to limit myself to the exact construction as herein set forth; but—

Having fully described my invention, what I claim as new and desire to secure by Letters Patent, is:

The combination in a telephone call memorandum device of the character described, comprising a flat oblong holder open at the upper end thereof, a plurality of pockets provided within the said holder, a plurality of slides, slidably secured within the said pockets and adapted to extend above and without the said pockets, indexes provided on the said extended portions, a plurality of letter spaces provided on the said slides, having characters printed therein, and located below the said indexes, substantially as described.

In testimony whereof I affix my signature in presence of two witnesses.

SAMUEL KAHN.

Witnesses:
E. WALTON BREWINGTON,
HOWARD EMBERT.